United States Patent [19]

Fukae et al.

[11] Patent Number: 4,814,798
[45] Date of Patent: Mar. 21, 1989

[54] COMBINED ELECTROGRAPHIC PRINTER, COPIER, AND TELEFAX MACHINE WITH DUPLEX CAPABILITY

[75] Inventors: Kensuke Fukae, Monsey, N.Y.; Shozo Kaieda, Nagano, Japan

[73] Assignee: Kentek Information Systems, Inc., Allendale, N.J.

[21] Appl. No.: 164,561

[22] Filed: Mar. 7, 1988

Related U.S. Application Data

[63] Continuation-in-part of Ser. No. 61,425, Jun. 9, 1987, Pat. No. 4,754,300.

[51] Int. Cl.$^4$ ............................................. G01D 15/00
[52] U.S. Cl. ..................................... 346/160; 358/257
[58] Field of Search ............... 358/210, 209, 304, 257, 358/300; 355/3 R, 3 TR, 3 CH, 3 DD, 14 R, 14 TR, 14 CH, 13; 346/107 R, 160, 153.1

[56] References Cited

U.S. PATENT DOCUMENTS

| | | | |
|---|---|---|---|
| 4,268,157 | 5/1981 | Ebi et al. | 355/3 TR |
| 4,398,816 | 8/1983 | Nakajima et al. | 355/3 TR |
| 4,402,591 | 9/1983 | Nakahata | 355/3 TR |
| 4,640,601 | 2/1987 | Deguchi et al. | 355/14 R |
| 4,734,760 | 3/1988 | Futaki | 358/257 |

*Primary Examiner*—Arthur G. Evans
*Attorney, Agent, or Firm*—Marmorek, Guttman & Rubenstein

[57] ABSTRACT

An electrographic printing apparatus is capable of functioning as a copier, printer, and telefax machine, and is also capable of duplex printing. The electrographic printing apparatus includes a photoconductive member in the form of a disposable cassette which is mounted at an angle in the housing. The apparatus include an optical print head which can receive information from a local or remote source to form an electrostatic latent image on the photoconductive member and thus act as a printer. The apparatus also includes a device for scanning and digitizing an original document. When the digitized image is transmitted to the optical print head, a copy of the original document is produced. When the digitized image is transmitted over the telephone lines to a remote receiver, the apparatus functions as a telefax machine. The electrographic printing apparatus also includes a first paper path along which a sheet of paper travels and is imprinted on one side by the photoconductive member, and a second paper path which receives the sheet of paper from the first paper path, turns the paper over, and returns it to the first paper path for imprinting on a second side. A paper tray with sidewalls is also provided. The paper tray acts as an alignment correction system before a sheet of paper being duplex printed is imprinted on its second side. Alternatively, the paper tray can serve as a second source of paper for introducing paper into the apparatus.

45 Claims, 4 Drawing Sheets

COMBINED ELECTROGRAPHIC PRINTER, COPIER, AND TELEFAX MACHINE WITH DUPLEX CAPABILITY

REFERENCE TO RELATED APPLICATION

This is a continuation-in-part of application Ser. No. 061,425, filed June 9, 1987, now allowed.

BACKGROUND OF THE INVENTION

This invention relates to a combined electrographic printing, copying, and telefax machine. More specifically, the present invention relates to a compact electrographic printing apparatus which is capable of:

(1) scanning and copying an original document,
(2) receiving and printing information derived from a local source, such as information derived from a computer connected to the printing apparatus,
(3) receiving and printing information derived from a remote source, for example, information derived from a remote computer or telefax machine, and
(4) scanning an original document and transmitting the information thereon to a remote source via the telephone lines.

In addition, the printing apparatus is capable of duplex printing, that is, printing on both sides of a sheet of paper.

All of the foregoing printing functions are performed on plain paper using an electrographic or xerographic printing engine which, in one particularly preferred embodiment, includes a disposable cassette containing a photoconductive belt.

In the process of electrographic or xerographic printing, a photoconductive member is employed to record an image on a photosensitive surface. The photoconductive member, which may typically take the form of a belt or a drum, is charged to a substantially uniform potential to sensitize its surface. A light is then employed to discharge selected areas of the photosensitive surface to form an electrostatic latent image on the photoconductive member.

In the case of a copying machine, an original document is exposed to high intensity light. Through the use of a slit aperture, mirrors, and various other optical components, the reflected light image of the original document is shined onto a sensitized photoconductive member where it discharges selected areas of the photosensitive surface. This light image is recorded as an electrostatic latent image on the photoconductive member which latent image corresponds to the informational areas contained on the original document.

In the case of an electrographic printer connected to a computer, a similar process is used to record information on the photoconductive member. The charged portion of the photosensitive surface is exposed to a light image, the shape of which is controlled by input signals from the computer. For example, a laser or an LED array functions as an optical print head and illuminates the photoconductive member with a light image, the characteristic shape of which is controlled by a stream of data from the computer. Here too, an electrostatic latent image corresponding to desired informational areas is recorded on the photoconductive member.

After recording the electrostatic latent image on the photoconductive member, the latent image is developed by bringing a developer material or toner into contact with it. The developer material comprises triboelectrically charged toner particles which are attracted to the electrostatic latent image. The toner particles form a mirror image on the photoconductive member corresponding to the electrostatic latent image. This powder image is subsequently transferred to a sheet of recording medium, such as a sheet of paper, by a transfer unit. In general, the transfer unit comprises a corona charger which creates a high intensity electric field of suitable polarity about the sheet of paper. The powder image, comprising charged toner particles on the photoconductive member are attracted and transferred to the sheet. Thereafter, the powder image is permanently affixed to the sheet in image configuration by a variety of methods such as by fusing, and the sheet is ejected.

The above-mentioned operations may be carried out by arranging a number of stations in sequence about the photoconductive member. Thus, the photoconductive member is usually surrounded in sequence by a charging station to charge the photoconductive member, an imaging station to form an electrostatic latent image on the photoconductive member, a developing station to develop the electrostatic latent image on the photoconductive member, and a transfer station to transfer the developed image from the photoconductive member to the sheet of recording medium. A discharging station and a cleaning station are also arranged about the photoconductive member to ready it for use again.

The assignee of the present invention has disclosed and claimed in a number of patents and patent applications electrographic printer/copiers and components thereof which utilize the above-described principles. A basic objective of the assignee has been to design electrographic printer/copiers from modular components. These modular components can be easily replaced when their useful lives have been exceeded or when they become defective. Another basic objective has been to design electrographic printer/copiers with simplified paper paths which can be easily accessed from the outside in order to remove paper jams. One such electrographic printer/copier employing modular units and a simplified paper path is described in the assignee's U.S. Pat. No. 4,664,507. A photoconductive belt in the form of a disposable cassette with a charging unit attached thereto is described in the assignee's U.S. Pat. No. 4,657,369. Other components are described in U.S. Pat. No. 4,639,116 (developer unit), application Ser. No. 718,945, filed Apr. 2, 1985 (paper input cassette), application Ser. No. 033,458, filed Apr. 1, 1987 (cleaning unit), and application Ser. No. 033,457, filed Apr. 1, 1987 (cleaning unit). All of these components may suitably be used in the electrographic printer/copier of the aforenoted U.S. Pat. No. 4,664,507.

In application Ser. No. 039,464, filed Apr. 16, 1987, the inventors herein have described an electrographic printer/copier similar to the one described in U.S. Pat. No. 4,664,507 but which is also capable of duplex printing, that is, printing on both sides of a sheet of paper. The electrographic printer/copier of that application utilizes the same modular units as the apparatus of U.S. Pat. No. 4,664,507, including the previously mentioned photoconductive belt in the form of a disposable cassette. Other aspects of this duplex printing machine are described and claimed in applications Ser. Nos. 116,362 and 116,363, both filed Nov. 2, 1987.

All of the foregoing patents and patent applications have been assigned to the present assignee and all are incorporated herein by reference.

Telefax transmitting and receiving machines, also known as facsimile machines, resemble electrographic copiers and printers in many respects. Typically, telefax machines include a device for scanning an original document and for digitizing the scanned image, and a printing engine. Advanced high speed, high resolution, telefax machines employ charge-coupled devices (CCD's) for digitizing the scanned image. All CCD's are basically shift registers which digitize analog information and store the digitized information until it is delivered as an electrical signal. CCD's have been utilized as image sending devices for a variety of purposes. In particular, CCD linear arrays have been used as linear sensing devices in high performance telefax machines. To transmit information, such as graphics or text, on a sheet of paper via a telefax machine, the sheet of paper is scanned with a high intensity light and the image is focused onto a CCD linear array. The CCD digitizes the image and converts it into a stream of data, or bit stream. This bit stream, which optionally may be compressed by a variety of known techniques, is then transmitted over the telephone lines to a remote location using a modem.

A telefax machine or a computer at the remote location includes a modem to receive the bit stream over the telephone lines. After decompression when required, the bit stream controls the operation of a print engine to reproduce the information contained on the scanned original document. Telefax machines are known which employ an electrographic process to reproduce the original document at a remote location. Thus, in a process very similar to that described above for a printer, the bit stream received at the remote location can control an optical print head to focus an image on a photoconductive member and thereby produce an electrostatic latent image thereon corresponding to the original document. The electrostatic latent image can then be developed with a toner to form a powder image which is then transferred and fused to a sheet of plain paper.

As copiers, printers and telefax machines can all be adapted to employ an electrographic process to print information on a sheet of recording medium, it would be desirable to provide a single machine which is switchable between copying, printing, and telefax transmitting and receiving modes.

It is therefore an object of the present invention to provide an electrographic printing machine which is capable of:

(1) scanning and copying an original document,
(2) receiving and printing information derived from a local computer,
(3) receiving and printing information derived over the telephone lines from a remote computer or telefax machine, and
(4) scanning an original document and transmitting the information thereon over the telephone lines to a remote computer or telefax machine.

It is a further object of the present invention to provide an electrographic printing machine of the kind just described which is further capable of duplex printing, that is, of printing on both sides of a sheet of paper.

It is a further object of the present invention to provide such a machine which has an input paper cassette and an input paper tray, the input paper tray serving as an alignment correction means for paper being duplex printed.

It is a further object of the present invention to provide such a machine which utilizes the modular photoconductive assembly belt described in U.S. Pat. No. 4,657,369.

It is yet another object of the present invention to provide such an electrographic printing apparatus which has a simple paper path which can be accessed from the outside to remove paper jams.

As used herein, the term "electrographic printing apparatus" and the like are intended to include copiers, printers and telefax machines which employ a photoconductive member to print information on a sheet of recording medium.

SUMMARY OF THE INVENTION

These and other objects are accomplished by means of the present invention which comprises an electrographic printing apparatus capable of functioning as a copier, printer, and telefax machine. In a first preferred embodiment, the electrographic printing apparatus comprises a housing, a source of copy material, such as a sheet of paper, a photoconductive member, means for discharging selected portions of the -photoconductive member to form an electrostatic latent image on the photoconductive member, means for developing the electrostatic latent image, and means for transferring the developed image to the copy material. Preferably the means for discharging selected portions of the photoconductive member comprises an optical print head. The optical print head is controlled by a stream of data received from a local source, or by a stream of data received from a remote source, such as a remote computer or a remote telefax machine.

The electrographic printing apparatus of the first preferred embodiment also includes means for scanning an original document and means for projecting the scanned image onto the photoconductive member to produce an electrostatic latent image thereon. Alternatively, the projecting means can project the scanned image onto a CCD linear array where it is digitized. The digitized image, after compression, can then be sent to a remote location using a modem and the telephone lines. Thus, the electrographic printing apparatus of this first preferred embodiment is switchable between acting as a printer, a copier, and a telefax machine.

In a second preferred embodiment of the present invention, the electrographic printing apparatus is capable of duplex printing and includes digital scanning means for scanning an original document and projecting the scanned image onto a CCD linear array where it is digitized. This second preferred embodiment also includes a controller which receives the digitized image from the CCD array and creates a bit map. The controller can then selectively actuate the optical print head to reproduce the scanned image. Alternatively, the controller can direct the digitized image to be transmitted over the telephone lines to a remote location via a modem.

The electrographic printing apparatus of this second preferred embodiment also includes first and second paper paths along which the sheet of paper travels. As the sheet travels along the first paper path, it is brought into contact with the photoconductive member on a first side and is imprinted on that side. Thereafter, the sheet is received in the second paper path, where it is turned over and returned to the first paper path so that it can be brought into contact with the photoconductive again and imprinted on its second side.

In the second preferred embodiment, the electrographic printing apparatus includes a modular photoconductive belt which is mounted at an angle to the first paper path in the housing. The housing is of a "clam shell" design so that it can be opened up and the photoconductive belt slidably removed.

Also, in the second preferred embodiment the electrographic printing apparatus includes a skew or alignment correction mechanism in the form of a paper tray. A sheet of paper which is travelling along the second paper path enters a paper tray having upwardly extending guide walls for alignment correction before being returned to the first pape path for imprinting on its second side. Additionally, the paper tray may be utilized as a paper input mechanism. Individual sheets of paper may be placed on the paper tray and thereby introduced into the housing of the printing apparatus.

Other further and favorable aspects of the present invention may be discerned from the detailed description set forth below.

DETAILED DESCRIPTION OF PREFERRED EMBODIMENTS

Figure 1:
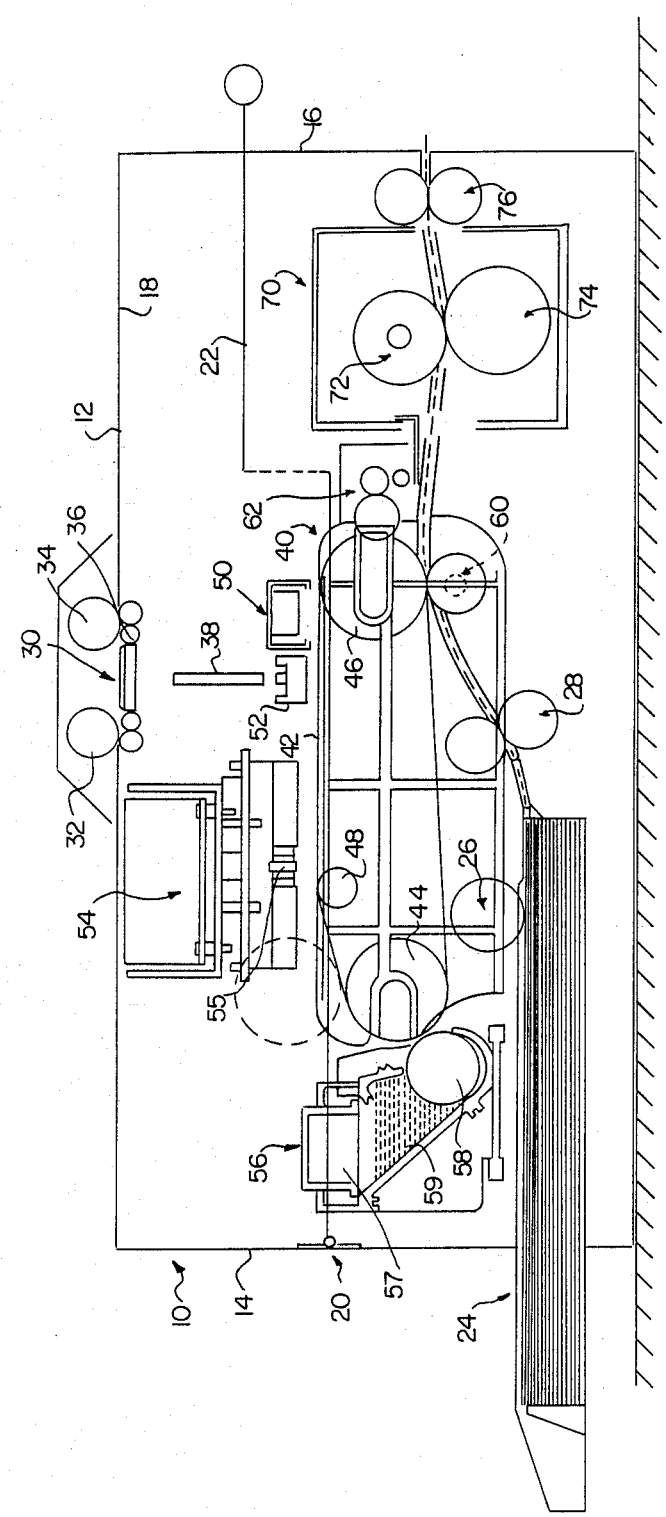
FIG. 1 is an illustration of a first preferred embodiment of the combined electrographic printer, copier, and telefax machine of the present invention.

Referring to FIG. 1, a schematic representation of a first preferred embodiment of the electrographic printer, copier, and telefax machine of the present invention is shown.

The novel electrographic printing apparatus 10 of the first preferred embodiment comprises a housing 12 which includes side walls (not shown), a front wall 14, a back wall 16, and a top 18. A hinge 20 is located in front wall 14. The top 18 is desirably spring-loaded downward and held in place by a catch (not shown). The catch may be released at which time top 18 pivots upward about hinge 20 along the parting line 22. When this is done, the housing is opened along parting line 22 for easy access inside housing 12. Thus, paper jams may be removed and components within the apparatus can be replaced.

A paper feeding cassette 24 protrudes through front wall 14. Paper cassette 24 holds a supply of recording medium, for example, sheets of plain paper. The paper cassette may be of the kind described in the present assignee's previously mentioned application Ser. No. 718,945, filed Apr. 2, 1985, or may be of another kind. The sheets of paper stacked inside cassette 24 are removed by means of paper feed roller 26. Registration rollers 28 carry the sheets of paper along paper path 29.

Top 18 of housing 12 includes an exposure window 30 and rollers 32 and 34 for aligning an original document to be scanned opposite exposure window 30. Just inside top 18, an aperture fluorescent 36 is provided for flashing the original document and for producing a scanned image.

Inside housing 12 are photoconductive belt assembly 40 and the various other components which are needed to ensure that electrographic printing apparatus 10 carries out its varied tasks. Photoconductive belt assembly 40 is in the form of the disposable cassette described in the present assignee's previously mentioned U.S. Pat. No. 4,657,369. It includes photoconductive belt 42, transport rollers 44 and 46, and idler roller 48. Transport rollers 44 and 46 rotate in a counterclockwise direction as viewed in FIG. 1.

Arranged about photoconductive belt assembly 40 are various stations and units. Starting with charging station 50 and travelling counter-clockwise, they are CCD linear array 52, optical print head 54, developer unit 56, transfer roller 60, and cleaning unit 62. A fusing station 70, which includes heated roller 72 and rubber roller 74, and exit rollers 76 are also provided inside housing 12.

Betwen aperture fluorescent 36 and CCD linear array 52 is an image transmitter 38 of variable focal length. Image transmitter 38 may, for example, comprise a bundle of optical fibers having graded refractive indexes such as that sold by Nippon Sheet Glass Co., Ltd., of Japan under the name Selfoc. The Selfoc optical fiber bundle 38 can be adjusted for various focal lengths so that the image of the scanned document can be switchably projected and focussed onto either photoconductive belt 42 or onto CCD linear array 52, as desired. A second image transmitter 55, which also may be a Selfoc optical fiber bundle, is disposed between optical print head 54 and photoconductive belt 42. The light image from optical print head 54, which preferably comprises an LED array, is focused onto photoconductive belt 42 by means of Selfoc optical fiber bundle 55.

Developer unit 56 is similar to the developer unit which is disclosed and claimed in the present assignee's U.S. Pat. No. 4,639,116. It includes a disposable toner cartridge 57 and a magnetic brush 58 which applies the developer material 59, which, in this case, is a single component developer. Whereas the developer unit described in the assignee's previously mentioned application acts as both a developer unit and a cleaning unit, the developer unit of the present invention functions as a developer only. This is because a separate and independent cleaning unit 62 is provided as a cleaning station for photoconductive belt 42. Cleaning unit 62 may be any of those well known to those skilled in the art, but preferably comprises the cleaning unit which is the subject of the assignee's application Ser. No. 033,457, filed Apr1, 1987.

Rather than employing a traditional corona charger to transfer the developed image from the photoconductive belt to the sheet of recording medium, in the embodiment of the present invention illustrated in FIG. 1, a biased transfer roller 60 is used to transfer the developed image to the sheet of paper. Transfer roller 60 is made from a metal or a photoconductive plastic material. Transfer roller 60 is biased at a voltage of about +24V to about +100V. While the use of biased transfer rollers has been known in the past, see for example U.S. Pat. No. 3,907,421 (Jordan et al.), such prior art transfer rollers have been biased at a much higher voltage, for example, in the range of about 2,000–3,000V in order to accommodate high speed copiers and printers. However, in accordance with the present invention, a much smaller voltage is needed because the printing time need not be a great as in prior art devices.

Transfer roller 60 performs an important function in holding the paper directly against photoconductive belt 42. This obviates the need for paper supporting elements, such as rollers, which are required when transfer is accomplished by means of a corona charger. Furthermore, because the paper is held directly against photoconductive belt 42 by means of transfer roller 60, transfer zone itself is extremely short, and the overall paper path is both simple and short.

The electrographic printing apparatus illustrated in FIG. 1 contains an on-board controller which controls and coordinates each of the operations of its various components. The controller receives a variety of signals from various sensors and command stations associated with the printer and sends out a variety of signals in response thereto. Thus, the controller receives signals from the various sensors to detect malfunctions in the printer and sends out signals to alert the operator to these malfunctions. The on-board controller also controls all of the operations of the printer and detects when the operator has selected any of the various functions which the printer is capable of carrying out. The controller ensures that each of the components necessary to carry out the operation fulfills its function as will be described hereinbelow.

(1) In the event the operator decides to copy and print an original document, the on-board controller activates the machine so that photoconductive belt 42 begins to rotate in a counterclockwise direction and charging unit 50 is switched on. Charging unit 50 uniformly charges the photosensitive surface of photoconductive belt 42 to a relatively high uniform negative potential on the order of about −600V. In the meantime, the original document, which has been placed opposite exposure window 30 is illuminated by means of aperture fluorescent 36. Selfoc fiber bundle 38 is adjusted so that an image of the original document is projected and focussed onto a uniformly charged photosensitive surface of photoconductive belt 42. This projected image selectively discharges portions of the photoconductive belt to form a latent electrostatic image of −150V portions surrounded by −600V background regions. The electrostatic latent image is brought opposite magnetic brush 58 of developer unit 56 and toner is applied to photoconductive belt 42. The toner particles carry a charge on the order of about −100V and are attracted to the "relatively positive" −150V discharged regions of the photoconductive belt while being repelled from the −600V regions of the photoconductive belt.

Simultaneously, paper feed roller 26 is actuated to deliver a sheet of plain paper along paper path 29. The sheet is brought between photoconductive belt 42 and transfer roller 60. Transfer roller 60, biased at a voltage of +24V to about +100V by means well known to those skilled in the art, creates an electric field about the sheet of paper whereby the developed powder image is attracted from photoconductive belt 42 to the top side of the sheet of paper. The sheet of paper then enters fusing station 70 where heated roller 72 fuses the powder image into the paper. From there the sheet of paper is brought by means of exit rollers 72 through an ejection aperture in back wall 16. At the same time, cleaning unit 62 is activated to remove residual toner particles from photoconductive belt 42 and to prepare photoconductive belt 42 for use once again.

(2) In the event the operator has elected to transmit the image of the original document via the telephone lines to a remote location, Selfoc fiber bundle 38 projects and focusses an image of the original document onto CCD linear array 52. CCD linear array 52 digitizes the image line by line and the controller, using appropriate software, compresses the digitized image and forms it into a bit stream. The controller then activates a modem (not shown) which transmits the compressed bit stream via the telephone lines to a remote location.

(3) In the event the operator elects to print or download information from a computer connected directly to the electrographic printing apparatus, the operation of the machine is similar to that described for copying an original document. However, in this case, optical print head 54 projects a light image in response to signals received from the controller. This light image is focussed by means of fiber optic bundle 55 onto photoconductive belt 30 to form an electrostatic latent image of the information to be printed onto photoconductive belt 42. Thereafter, development and transfer of the electrostatic latent image to a sheet of recording medium occurs in the same manner as previously described.

(4) In the event it is desired to print information from a remote source, such as a remote computer or a remote telefax machine, a bit stream is received by the controller's modem. The on-board controller activates optical print head 54 in conformity with the information received from the remote source. Thereby, the information received from the remote source is formed as an electrostatic latent image on photoconductive belt 42 and is developed and transferred to a sheet of recording medium as previously described.

Thus, the electrographic printing apparatus illustrated in FIG. 1 is capable of acting as a copier, a printer, and a telefax machine. By using appropriate software, it is also possible to adapt this machin to store an image of the original document as digitized information in a computer for later retrieval.

It is important to the configuration of the electrographic printing machine of FIG. 1 that the photoconductive belt assembly 40 be mounted horizontally within housing 12 of the device. This is important because it enables the apparatus of the present invention to be a compact, low-profile machine. The machine is apprximately of briefcase size. The horizontal configuration also provides more room opposite photoconductive belt 42 so that an optical print head can be disposed along side of the units needed for copying an original document or transmitting its image to a remote location.

Figure 2:
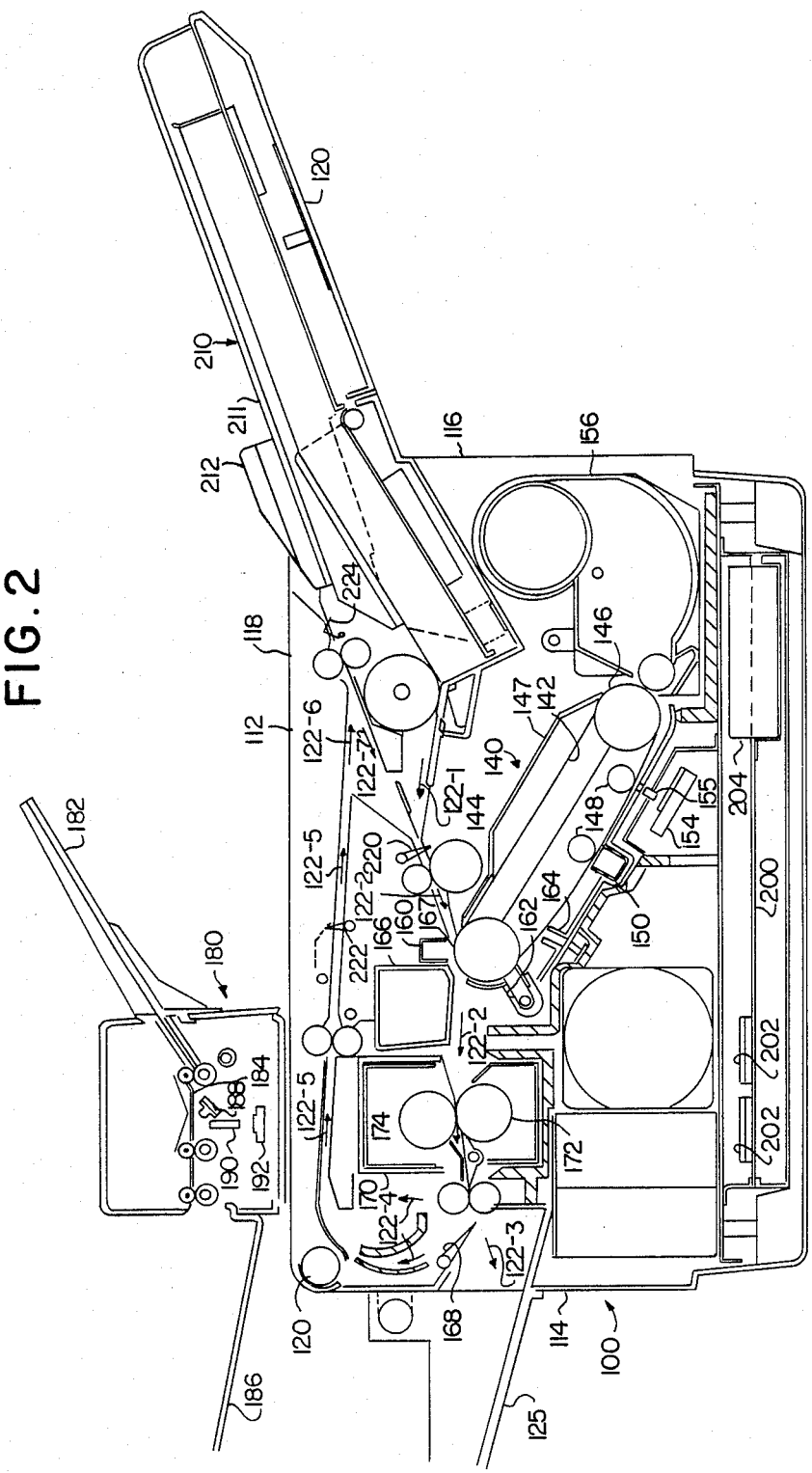
FIG. 2 is an illustration of a second preferred embodiment of the combined electrographic printer, copier, and telefax machine of the present invention which is capable of duplex printing.
Figure 3:
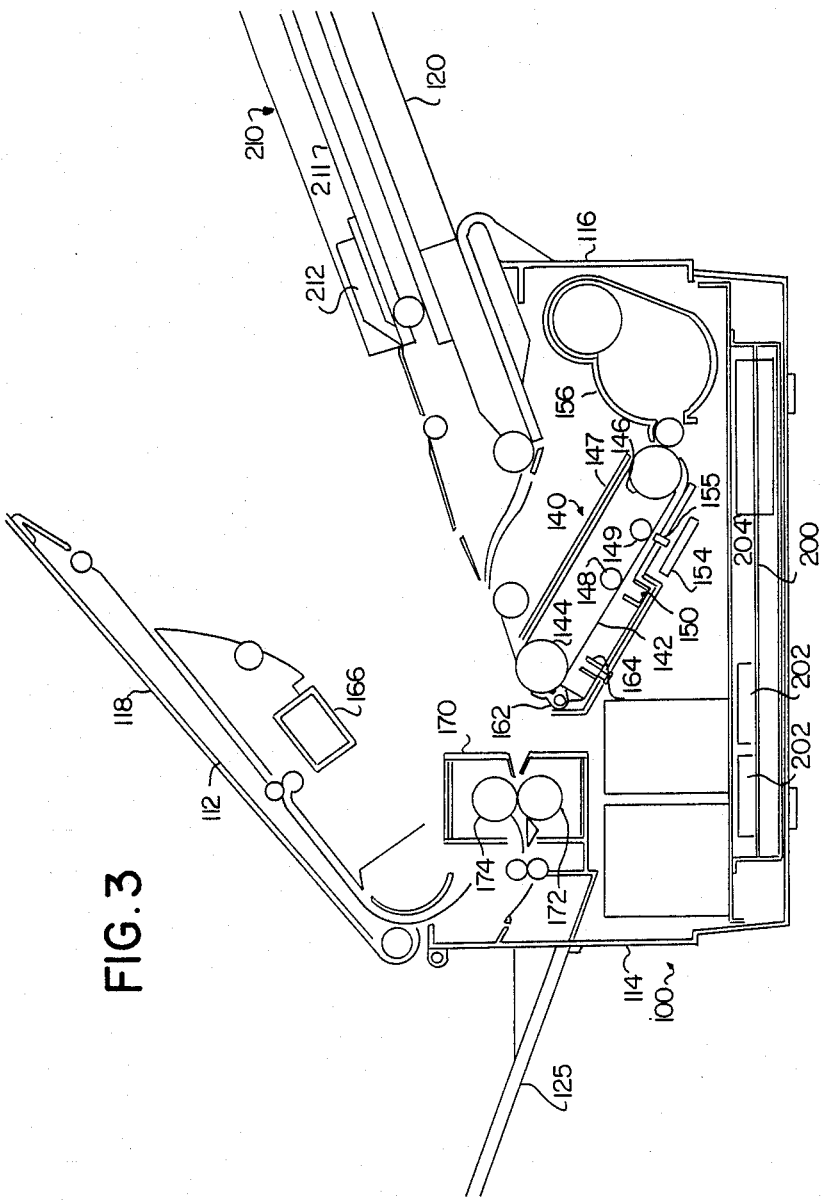
FIG. 3 is an illustration of the device similar to that of FIG. 2 with its top lifted upward and a digital scanning unit removed.

Referring now to FIGS. 2 and 3, a second preferred embodiment of an electrographic printing apparatus 100 capable of functioning as a combined printer, copier, and telefax machine is illustrated. Printing apparatus 100 of FIGS. 2 and 3 is similar in many respects to printing apparatus 10 of FIG. 1. Printing apparatus 100 comprises a housing 112, side walls (not shown), a front wall 114, a back wall 116, and a top 118. A hinge 120 is located in front wall 114. The top 118 is spring-loaded downward and held in place by a catch (not shown). The catch may be released at which time top 118 pivots upward about hinge 120. When this is done, the housing is opened upwards, as shown in FIG. 3 for easy acces inside housing 112.

Inside housing 112 are photoconductive belt assembly 140 and the various other components similar to those previously described. Photoconductive belt assembly 140 is in the form of the disposable cassette described in U.S. Pat. No. 4,657,369, and includes photoconductive belt 142, transport rollers 144 and 146 and idler rollers 148. Transport rollers 144 and 146 rotate in a counter-clockwise direction as viewed in FIGS. 2 and 3. A light seal cover 147 is also provided to prevent stray light from discharging the photosensitive surface of photoconductive belt 142.

In the embodiment of the invention illustrated in FIGS. 2 and 3, photoconductive belt assembly 140 is mounted at an oblique angle inside housing 112. It is slidably snapped into place in a manner similar to that described in U.S. Pat. No. 4,657,369. As illustrated in FIG. 3, when top 118 is swung upward, easy access to photoconductive belt assembly 140 is provided. It may then be slid out of the housing and replaced.

Arranged about photoconductive belt assembly 140 are charging corona 150, optical print head 154, developer unit 156, transfer corona 160, cleaning unit 162, and erase lamp 164. An image transmitter in the form of Selfoc optical fiber bundle 155 is disposed between optical print head 154 and photoconductive belt 142 to project and focus the light image from optical print head 154 onto photoconductive belt 142. Optical print head 154 comprises in this instance an LED array although other optical print heads are also within the scope of the present invention.

The electrographic printing apparatus 100 of FIGS. 2 and 3 employs transfer corona 160 to effect transfer of the powder image rather than the biased transfer roller 60 of printing apparatus 10. A vacuum transport unit 166, such as the one described in U.S. Pat. No. 4,664,507, is provided to transport a sheet of paper or the like from the transfer zone 167 to the fusing station 170, which includes heated roller 172 and rubber roller 174. Vacuum transport unit 166 is attached to the underside of top 118 and lifts upwardly with it as shown in FIG. 3.

A digital scanning unit 180 (FIG. 2 only) is mounted on top 118 of printing apparatus 100. Digital scanning unit 180 includes an input tray 182, an exposure window 184, an output tray 186 and a number of rollers for transporting an original document across exposure window 184. An aperture fluorescent 188 is provided opposite exposure window 184 for flashing the original document as it is transported across exposure window 184. A Selfoc optical fiber bundle 190 projects and focusses the image of the original document onto CCD linear array 192. CCD linear array 192 digitizes the image line-by-line and sends a bit stream corresponding to the information o the original document to on-board controller 200. Controller 200 of printing apparatus 100 is in the form of a card which plugs into a suitable receptacle in housing 112. The card includes various chips, such as memory chips 202, which are mounted thereon. Controller 200 interfaces with floppy disk drive 204 and also with CCD linear array 192, a modem (not shown), and a host computer (not shown).

Controller 200 controls all of the operations of printing apparatus 100 and detects when the operator has selected any of the various functions which printing apparatus 100 is capable of carrying as described below.

(1) In the event the operator decides to copy and print an original document, controller 200 activates digital scanning unit 180 so that the original document to be copied is placed opposite exposure window 184 and is illuminated by means of aperture fluorescent 188. Selfoc lens 190 projects an image of the document onto CCD linear array 192 which converts the image into a bit stream. The bit stream is sent to controller 200 where it is converted into a bit map corresponding to the original document. Optical print head 154 is actuated by signals received from controller 200 to produce an electrostatic latent image corresponding to the original document on photoconductive belt 142. Note that in copying an original document printing apparatus 100 operates in a different manne than printing apparatus 10 wherein an image of the original document is projected directly onto the photoconductive belt to form a latent electrostatic image. In contrast, printing apparatus digitizes a document to be copied, creates a bit map of the original document, and then uses an optical print head to reproduce the original document.

(2) In the event the operator has elected to transmit the image of the original document via the telephone lines to a remote location, controller 200 activates a modem and transmits the bit stream via the telephone lines to a remote receiver.

(3) In the event the operator elects to print or download information from a host computer, controller 200 receives a bit stream from the host computer and converts it into a bit map. Optical print head 154 is then actuated by signals received from controller 200 to produce an electrostatic latent image on photoconductive belt 142 corresponding to the information which is desired to be printed.

(4) In the event it is desired to print information received from a remote source, such as a remote computer or a remote telefax machine, a bit stream is received by the controller's modem. Controller 200 activates optical print head 154 in conformity with the information received from the remote source to form an electrostatic latent image on the photoconductive belt 142 in the same manner as previously described.

The duplex printing capability of the printing apparatus 100 will now be described. Copy material, e.g., paper or the like, is derived from paper input cassette 120. For purposes of explanation, it will be assumed that a sheet of paper with a first side "A" facing down and a second side "B" facing up is supplied by cassette 120 by means of suitable rollers. The paper is first directed along a branch 122-1 of the paper path generally designated 122 until it enters a first main portion 122-2 of the paper path, as shown by the lower set of arrows in FIG. 2. Portion 122-2 of the paper path leads the sheet of paper into contact with photoconductive belt 142 in image transfer region 167. While the sheet of paper is in transfer region 167, it is imprinted from below onto its underside, in this case side A. From the image transfer region 167, the paper is transported along portion 122-2 of the paper path 122 to fuser unit 170 by means of a vacuum transport unit 166. In the event duplex printing has not been selected, paper guide 168 is pivoted upward and the paper continues along a branch 122-3 of the paper path and is ejected into output tray 125 with its printed side, side A, face down, thus being automatically collated.

In the event duplex printing is selected, paper guide 168 is pivoted downward and the sheet of paper is not ejected into output tray 125 after it passes through fuser unit 170. Rather, the paper enters an area of reversion 122-4 of paper path 122 where it is turned over so that side B now becomes the underside. The paper then enters second main portion 122-5 of paper path 122. This second main portion 122-5 of the paper path is located immediately below top 118 of the printer 100. Being located in such close proximity to top 118 permits easy access to the sheet of paper as it travels along the paper path in the event of a paper jam.

The sheet of paper next enters a branch 122-6 of paper path 122 where paper tray 210 which functions as paper skew or alignment correction device is mounted on housing 118. Paper skew correction device 210, which is in the form of a paper tray, mechanically realigns the paper horizontally s that when it is imprinted on its second side, side B, all of the margins will be properly aligned to coordinate with the printing on side A.

After being realigned by paper skew correction device 210, the paper returns to the first main portion 122-2 of paper path 122 via a reversion portion 122-7. This time the sheet travels along portion 122-2 with its second side, side B, as its underside. The paper enters transfer region 167 once again and information is printed on side B of the sheet of paper as it makes contact with the photoconductive belt 142. Next, the printed paper is transported to fuser unit 170 by means of vacuum transfer unit 166 whose only contact now is with side A, the already imprinted and fused side of the paper. The unfused side, side B, does not come in contact with transport unit 166, thus avoiding smudging on that side of the paper. The fuser unit 100 then fuses the toner onto side B of the paper by applying heat to the paper and, paper guide 168 having been pivoted upward, the paper is ejected into output tray 125 with side B facing down. Since all of the imprinted paper is received with side B facing down, the paper is automatically collated as it is collected in output tray 125.

It will be observed that as the sheet of paper travels along straight portion 122-2 of the paper path, it travels with a leading edge, for example, the top of the sheet, in front. As the sheet passes through reversionary area 122-4 and enters straight portion 122-5 of the paper path, the sheet is turned over, so that side B becomes the underside. During this portion of the paper path, the sheet is still travelling with the same leading edge in front. It then enters branch 122-6, leading edge first, for realignment. When the sheet leaves branch 122-6 in order to re-enter portion 122-2 of the paper path, however, it does so with its trailing edge, i.e., its bottom edge, in front and with side B as its underside. In other words, the sheet of paper "backs out" of branch 122-6. As a result, of this backing out operation, the sheet is not turned over once again when it travels from portion 22-5 of the paper path back into portion 122-2. Side B which is the underside of the sheet as it travels along portion 122-5 of the paper path, remains the underside when it re-enters portion 122-2 of the paper path.

Summarizing, in the event duplex printing is not selected, the paper path may be described as follows:

120→122-1→122-2→122-3→125 with the paper being imprinted from below on Side A. In the event duplex printing is selected, the paper path is as follows:

120→122-1
→122-2→122-4→122-5→122-6→122-7→122-2→1-
22-3→125 with a "backing-out" operation occurring between portions 122-6 and 122-7 of the paper path, and with the paper being imprinted on both sides A and B.

It will be observed from this description, that the paper path schematically comprises a loop (122-2, 122-4, 122-5, and 122-7) with a number of branches (122-1, 122-3, and 122-6) extending from the loop. In particular, for duplex printing to take place, it is important that the paper follow a path comprising the loop 122-2, 122-4, 122-5, and 122-7, with a stop at the branch 122-6 for a backing out operation.

Controller 200 detects when the operator has selected duplex printing and sets paper guide 168 so that the sheet of paper will be either directed into output paper tray 125 or directed into the duplex printing path. A number of sensors, such as microswitches 220, 222, and 224 are distributed along the paper path. These sensors feed information to controller 200 so that it can keep track of the sheet of paper as it travels along the paper path. in particular, when sensor 224 is actuated, controller 200 becomes aware that a sheet of paper is contained in paper tray 210. Controller 200 then directs that the next paper feed should be from paper tray 210 and not from paper input cassette 120.

Another important function of controller 200 is to reformat the light image projected by optical print head 154 onto photoconductive belt 142 when imprinting on the second side of the sheet of paper is about to occur. As described above, the sheet of paper passes through portion 122-2 of the paper path the first time with a leading edge in front. However, when the sheet of paper passes through portion 122-2 the second time for printing on its second side, it does so with its trailing edge in front. This is because of the "backing out" operation which occurs when the paper reenters the loop after stopping in branch 122-6. Unless the light image is reformatted by the controller, the printing on the second side of the sheet of paper will be reversed from that on the first side.

Assuming, for example, that the leading edge is the top of the sheet of paper which passes through transfer region 167 the first time, printing will occur from top to bottom on the sheet of paper. When the sheet of paper passes through transfer region 167 the next time for imprinting on its second side, it passes through with its bottom edge first. Thus, in order for information to be printed properly on the second side of the paper, the light image from optical print head 154 must be reformatted from bottom to top. This is accomplished by means of the controller when the controller detects that the duplex printing feature has been selected.

Figure 5:
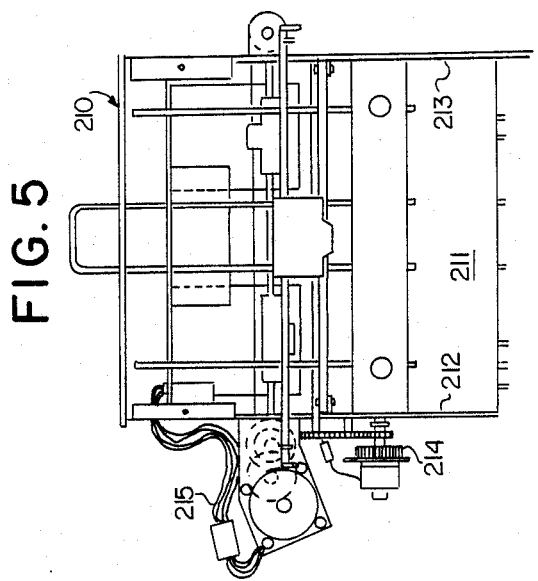
FIG. 5 is a top view of the paper tray of the device illustrated in FIG. 2.
Figure 4:
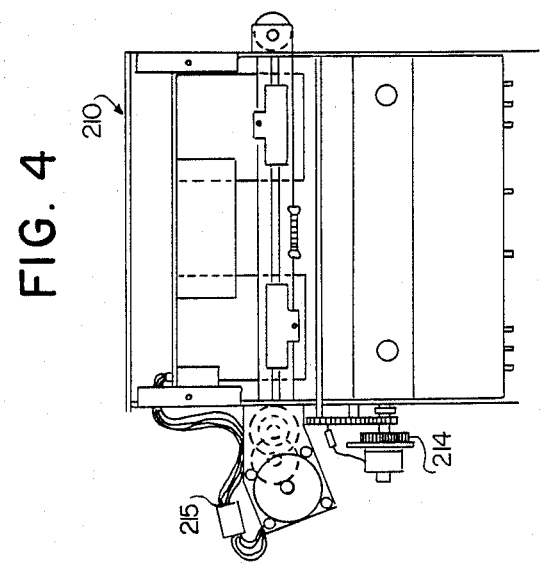
FIG. 4 is a bottom view of the paper tray of the device illustrated in FIG. 2.

Referring now to FIGS. 4 and 5, paper tray 210 extends to the outside of housing 112 and functions as a paper skew or alignment correction device. It comprises a bed 211 for receiving the paper and guide plates 212 and 213. The guide plates 212 and 213 realign the paper when it is ejected onto bed 211. A gearing system 214 and a servomotor 215 are also provided by means of which the distance between guide plates 212 and 213 are adjusted. Servomotor 215 is controlled by controller 200 which adjusts the distance between the guide plates in response to formatting signals received from a host computer. Alternatively, controller 200 may be interfaced with input paper tray 120 which has sensors to detect the width of the paper loaded into the trays. An example of such an input paper tray is described in application Ser. No. 718,945, filed Apr. 2, 1985, which is assigned to the present assignee and is incorporated herein by reference. The controller 200 adjusts the distance between guide plates 212 and 213 in response to signals received from these sensors.

Controller 200 also controls the paper rollers inside the electrographic printer 100 to carry out the desired "backing-out" operation when the paper visits paper skew correcting device 210. Thus, the controller acts to ensure that the paper rollers turn in one direction to eject the paper onto bed 211 of paper skew correcting device 210, and then acts to reverse the rotational direction of the paper rollers so that the backing-out operation is performed.

Controller 200 also enables paper tray 210 to function as a second source of paper in addition to paper input cassette 120. Thus, if paper or another recording medium is placed into paper tray 210, sensor 224 will send a detect signal to controller 200 indicating that paper is present in the paper tray. Controller 200 will then direct that paper be held back in cassette 120 and that the next sheet of paper should be fed into the paper path from paper tray 210. When paper tray 210 is used as the source of input paper, only a single sheet at a time should be placed on paper tray 210. Paper tray 210 can also be suitably modified to feed a single sheet at a time from a stack of sheets placed on the tray.

While the invention has been described by reference to specific embodiments, this was for purposes of illustration only and should not be construed to limit the spirit or the scope of the invention.

We claim:

1. An electrographic printing apparatus for producing hard copies of information on a sheet of paper or the like, comprising
   a housing,
   a photoconductive member,
   means for uniformly charging said photoconductive member,
   means for selectively discharging said photoconductive member in response to information received from a local or a remote source,
   scanning means for scanning and digitizing an original document and for producing a data stream corresponding to information contained on said original document,
   transmission means for transmitting said data stream to a remote location, and
   a controller for selectively actuating said selective discharge means, said scanning means, and said transmission means so that said electrographic printing apparatus is switchable between printing information received from a local source, printing information received from a remote source, scanning and copying an original document, and scanning and transmitting an image of an original document to a remote location,
   said electrographic printing apparatus further comprising a first paper path along which a sheet of paper travels, said first paper path being operative to bring a first side of said sheet into contact with said photoconductive member in a transfer zone to imprint said first side of said sheet, and
   a second paper path operative to receive said sheet from said first paper path, to turn said sheet over, and to return said sheet to said first paper path at a location prior to said transfer zone so that a second side of said sheet is imprinted.

2. The apparatus of claim 1 wherein said photoconductive member comprises photoconductive belt.

3. The apparatus of claim 1 wherein said photoconductive member comprises a photoconductive belt in the form of a disposable cassette.

4. The apparatus of claim 1 wherein said photoconductive member comprises a photoconductive belt in the form of a disposable cassette, said cassette being slidably and removably mounted within said housing.

5. The apparatus of claim 1 wherein said photoconductive member is located below said first paper path, said sheet being imprinted from below.

6. The apparatus of claim 1 wherein said photoconductive member comprises a photoconductive belt located below and obliquely to said first paper path, said sheet being imprinted from below.

7. The apparatus of claim 1 wherein said second paper path is located above said first paper path, said second paper path being adjacent the top of said housing.

8. The apparatus of claim 1 further comprising an openable lid at the top of said housing, said first and second paper paths being accessible from outside said housing upon opening said lid.

9. The apparatus of claim 1 wherein said sheet is in contact with said photoconductive member substantially only in said transfer zone.

10. The apparatus of claim 1 wherein said selective discharge means comprises an optical print head.

11. The apparatus of claim 1 wherein said selective discharge means comprises an LED array.

12. The apparatus of claim 1 wherein said scanning means includes a CCD array.

13. The apparatus of claim 11 wherein said scanning means includes a light source.

14. The apparatus of claim 12 wherein said scanning means includes an optical fiber bundle for projecting an image of said original document on said CCD array.

15. The apparatus of claim 13 further comprising transport means for transporting said sheet through said scanning means.

16. The apparatus of claim 1 further comprising vacuum transport means located above said first paper path for transporting said paper from above.

17. The apparatus of claim 1 further comprising alignment correction means located along said second paper path.

18. The apparatus of claim 17 wherein said alignment correction means comprises a paper tray extending to the outside of said housing.

19. The apparatus of claim 18 further comprising sensing means for detecting the presence of a sheet in said paper tray.

20. The apparatus of claim 18 wherein said paper tray comprises a second source of paper into said housing.

21. An electrographic printing apparatus for imprinting a sheet of paper or the like, comprising
   a source of paper,
   a housing,
   a photoconductive member for storing an electrostatic image and for imprinting said paper
   means for uniformly charging said photoconductive member,
   means for selectively discharging said photoconductive member in response to information received from a local or a remote source,
   scanning means for scanning and digitizing an original document and producing a data stream corresponding to information contained on said original document,
   transmission means for transmitting said data stream to a remote location, a controller for selectively actuating said selective discharge means, said scanning means, and said transmission means, so that said electrographic printing apparatus is switchable between printing information received from a local source, printing information received from a remote source, copying an original document, and transmitting an image of an original document to a remote location, a paper path along which said paper travels, said paper path comprising a loop and a branch extending therefrom, and paper transport means for receiving said paper from said source, for passing said paper along said loop wherein said photoconductive member imprints a first side of said paper, for turning said paper over, for passing said paper into said branch, and for returning said paper to said loop a second time for imprinting a second side of said paper.

22. The apparatus of claim 21 wherein said loop receives said paper from said source with a leading edge in front and a trailing edge in back, and said loop receives said paper from said branch with said trailing edge in front and said leading edge in back.

23. The apparatus of claim 21 further comprising an openable lid at the top of said housing, said paper path being accessible from outside said housing upon opening said lid.

24. The apparatus of claim 21 wherein said photoconductive member is disposed below said loop and imprints both sides of said paper from below.

25. The apparatus of claim 21 wherein said photoconductive member comprises a photoconductive belt disposed obliquely and below said loop.

26. The apparatus of claim 21 further comprising alignment correction means located along said branch.

27. The apparatus of claim 26 wherein said alignment correction means comprises a paper tray extending outside of said housing.

28. The apparatus of claim 27 further comprising sensing means for detecting the presence of paper in said paper tray.

29. The apparatus of claim 28 wherein said paper tray comprises a second source of paper for introducing paper into said housing from outside said housing.

30. An electrographic printing apparatus for imprinting a sheet of paper and the like, comprising a housing, a first source of paper for introducing paper into said housing, a photoconductive member for storing a latent electrostatic image of the information to be imprinted, means for uniformly charging said photoconductive member, means for selectively discharging said photoconductive member, a paper route comprising a first paper path operative for receiving paper from said first source and for bringing a first side of said paper into contact with said photoconductive member in a transfer zone to imprint said first side of said paper, and alignment correction means located along said paper route, said alignment correction means also comprising a second source of paper for introducing paper into said housing.

31. The apparatus of claim 30 wherein said paper route further comprises a second paper path operative to receive said paper from said first paper path, to turn said paper over, to introduce said paper into said alignment correction means, and to return said paper to said first paper path at a location prior to said transfer zone so that a second side of said paper is imprinted.

32. The apparatus of claim 30 wherein said alignment correction means comprises a paper tray extending outside of the housing of said housing.

33. The apparatus of claim 30 further comprising sensing means for detecting the presence of paper in said alignment correction means.

34. The apparatus of claim 30 wherein said photoconductive member comprises a photoconductive belt located below and obliquely to said paper path, said paper being imprinted from below.

35. The apparatus of claim 30 further comprising an openable lid at the top of said housing, said first and second paper paths being accessible from outside said housing upon opening said lid.

36. The apparatus of claim 30 further comprising vacuum transport means located above said first paper path for transporting said paper from above.

37. An electrographic printing apparatus for producing hard copies of information on a sheet of paper or the like, comprising a housing, a photoconductive member, means for uniformly charging said photoconductive member, means for selectively discharging said photoconductive member in response to information received from a local or a remote source, scanning means for scanning and digitizing an original document and for producing a data stream corresponding to information contained on said original document, transmission means for transmitting said data stream to a remote location, and a controller for selectively actuating said selective discharge means, said scanning means, and said transmission means, so that said electrographic printing apparatus is switchable between printing information received from a local source, printing information received from a remote source, scanning and copying an original document, and scanning and transmitting an image of an original document to a remote location, 38. The apparatus of claim 37 wherein said photoconductive member comprises a photoconductive belt.

39. The apparatus of claim 37 wherein said photoconductive member comprises a photoconductive belt located below and obliquely to said first paper path, said sheet being imprinted from below.

40. The apparatus of claim 37 wherein said selective discharge means comprises an optical print head.

41. The apparatus of claim 37 wherein said selective discharge means comprises an LED array.

42. The apparatus of claim 37 wherein said scanning means includes a CCD array.

43. The apparatus of claim 42 wherein said scanning means includes a light source.

44. The apparatus of claim 43 wherein said scanning means includes an optical fiber bundle for projecting an image of said original document on said CCD array.

45. The apparatus of claim 37 further comprising vacuum transport means for transporting said paper from above.

* * * * *